Patented Apr. 27, 1948

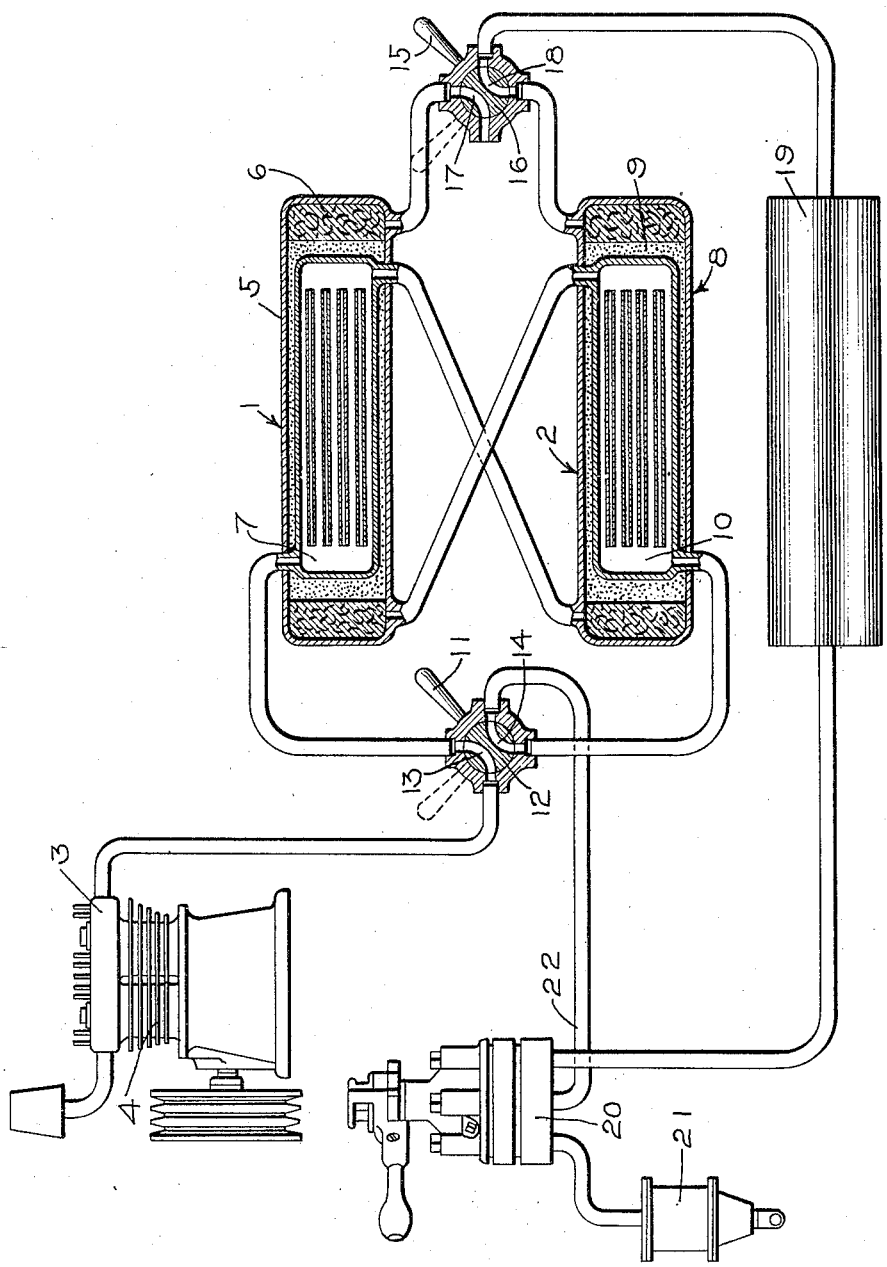

2,440,326

UNITED STATES PATENT OFFICE 2,440,326

AIR-DRYING APPARATUS

Norman Geoffrey Cadman, London, England, assignor, by mesne assignments, to The Westinghouse Air Brake Company, Wilmerding, Pa., a corporation of Pennsylvania Application January 24, 1945, Serial No. 574,356
In Great Britain March 9, 1944

4 Claims. (Cl. 303—1)

This invention relates to apparatus for removing moisture from air under pressure by means of silica gel or like material which is capable of absorbing moisture and can be regenerated by heating.

The removal of moisture from the compressed air used for operating fluid pressure apparatus such as railway brake equipment is extremely desirable in cases in which this apparatus is subject to low atmospheric temperatures owing to the liability of the moisture interfering with the proper operation of valves and other moving parts or the solidification of the lubricant employed.

It is found, however, that not only is the reheating of the silica gel, or the like, necessary for the regeneration of this material but is desirable also to pass a current of air substantially free from moisture through the material in order to carry away the moisture expelled by the heating action and according to the principal feature of the invention, the air from the exhaust port of the braking or other apparatus to which the dried air is supplied for operating the apparatus is utilized for this purpose.

In carrying the invention into practice as applied, for example, to fluid pressure braking apparatus for railway or other vehicles the air drying apparatus may comprise two dehydrator elements 1 and 2, one of the elements being arranged to be operative for a period during which the other element is inoperative and undergoing regeneration by being traversed by a stream of heated air from the head 3 of a compressor 4 from which the compressed air is supplied.

The dehydrator element 1 may consist of a casing 5 containing a body 6 of silica gel within which is imbedded a heater 7 of multi-tubular construction. Likewise, the dehydrator element 2 may comprise a casing 8 containing a body 9 of silica gel within which is imbedded a heater 10.

At the inlet ends of the dehydrator elements there is provided a rotary change-over valve device 11 comprising a rotatable plug valve 12 having two through ports or passages 13 and 14. At the outlet ends of the dehydrator elements there is a similar rotary change-over valve device 15 comprising a rotary plug valve 16 having two through ports or passages 17 and 18. With these valve devices 11 and 15 in the positions in which they are shown in the drawing, air delivered from the compressor on its way to a main reservoir 19 of the braking equipment traverses, in succession, port 13 in the plug valve 12 of the change-over valve device 11, the heater 7 of the inoperative dehydrator element 1, the body 9 of silica gel in the operative dehydrator element 2 and port 18 in the change-over valve device 15, the compressed air being dried thereby prior to its delivery to the main reservoir 19 which communicates in the usual manner with a brake control valve device 20.

The brake control valve device controls the supply of compressed air from the reservoir 19 to a brake cylinder 21 and the release of air from this cylinder to an exhaust port 22. The air from this exhaust port 22, instead of being vented directly to the atmosphere as usual, traverses in succession the other port 14 of the first change-over valve device 11, the heater 10 of the operative dehydrator element 2, the body 6 of silica gel in the inoperative dehydrator element 1 (which is undergoing regeneration) and the other port 17 in the second change-over valve 15 through which this exhaust air passes to the atmosphere, carrying with it the moisture being expelled from the silica gel body 6 by the heat from the heater 7.

When the regeneration of the inoperative dehydrator element is completed, the settings of the rotatable plug valves 12 and 16 of the two change-over valve devices 11 and 15, respectively, are reversed, thereby interchanging the paths of flow of the compressed and exhaust air through the two dehydrator elements as will be readily understood without further description.

It will be evident that the heated air for regeneration in the form of apparatus above described need not necessarily be derived from the compressor head and the heating of the silica gel for this purpose may be effected by any other suitable heating means.

Having now described my invention what I claim as new and desire to secure by Letters Patent, is:

1. An air pressure system to which air under pressure is supplied and from which air under pressure may be discharged and comprising the combination of an air receiver, an air compressor for supplying air under pressure to said receiver, means interposed between said compressor and said receiver for dehydrating the air under pressure supplied by said compressor, said means comprising a moisture absorbing material which can be regenerated, means for regenerating said material, and means for directing the air discharged from said system over said material when said material is being regenerated whereby the moisture expelled by the regeneration is carried away.

2. An air pressure system to which air under pressure is supplied and from which air under pressure may be discharged and comprising the combination of an air receiver, an air compressor for supplying air under pressure to said receiver, means interposed between said compressor and said receiver for dehydrating the air under pressure supplied by said compressor, said means comprising a moisture absorbing material which can be regenerated, means for regenerating said material, means for directing air exhausted from said system over said material, and means for rendering the last mentioned means effective when the material is to be regenerated.

3. An air pressure operated braking apparatus comprising the combination of a reservoir, a compressor for supplying air under pressure to said reservoir, a brake cylinder, a brake control valve device for supplying air under pressure from said reservoir to said brake cylinder to apply the brakes and for exhausting air under pressure from said brake cylinder to release the brakes, means interposed between said compressor and said reservoir for dehydrating the air under pressure supplied by said compressor, said means, comprising a moisture absorbing material which can be regenerated by expelling the moisture therefrom, means for regenerating said material, and means for connecting the air exhausted from said brake cylinder to the air dehydrating means to carry off the moisture expelled from the material during regeneration.

4. In combination, an air pressure apparatus braking system having a brake control valve device from which air under pressure is exhausted for controlling the brakes, an air drying apparatus for said system comprising two air drying elements of the type which may be regenerated by expelling the moisture therefrom, selector valve means whereby either one of said elements may be rendered inoperative and be regenerated and the other element may be rendered operative, and means for conducting the exhausted air from said brake control valve device through the element being regenerated to assist in expelling the moisture.

NORMAN GEOFFREY CADMAN.

REFERENCES CITED

The following references are of record in the file of this patent:

UNITED STATES PATENTS

| Number | Name | Date |
|---|---|---|
| 2,079,100 | Begg | May 4, 1937 |